(12) United States Patent
Nakamura et al.

(10) Patent No.: US 10,787,382 B2
(45) Date of Patent: Sep. 29, 2020

(54) GLASS-PLATE MANUFACTURING DEVICE

(71) Applicant: Nippon Electric Glass Co., Ltd., Shiga (JP)

(72) Inventors: Takahide Nakamura, Shiga (JP); Hiroyoshi Shindo, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 222 days.

(21) Appl. No.: 16/065,883

(22) PCT Filed: Jan. 5, 2017

(86) PCT No.: PCT/JP2017/000081
§ 371 (c)(1),
(2) Date: Jun. 25, 2018

(87) PCT Pub. No.: WO2017/159000
PCT Pub. Date: Sep. 21, 2017

(65) Prior Publication Data
US 2019/0010075 A1    Jan. 10, 2019

(30) Foreign Application Priority Data
Mar. 14, 2016   (JP) ................................ 2016-049778

(51) Int. Cl.
*C03B 35/16*      (2006.01)
*C03B 17/06*      (2006.01)
*C03B 25/12*      (2006.01)

(52) U.S. Cl.
CPC .......... *C03B 35/167* (2013.01); *C03B 17/064* (2013.01); *C03B 17/068* (2013.01); *C03B 25/12* (2013.01)

(58) Field of Classification Search
CPC ... C03B 17/067; C03B 17/068; C03B 25/087; C03B 35/165; C03B 35/18
See application file for complete search history.

(56) References Cited

U.S. PATENT DOCUMENTS

2013/0067958 A1*   3/2013   Kariya ................. C03B 17/064
                                                     65/53

FOREIGN PATENT DOCUMENTS

JP         05193964 A   *   8/1993  .......... C03B 17/068
JP      2015-105206       6/2015
(Continued)

OTHER PUBLICATIONS

Machine translation of JP 05-193964. (Year: 1993).*
(Continued)

*Primary Examiner* — Cynthia Szewczyk
(74) *Attorney, Agent, or Firm* — Wenderoth, Lind & Ponack, L.L.P.

(57) ABSTRACT

Provided is a manufacturing apparatus (1) for a glass sheet, including roller pairs (5), which are configured to convey a glass ribbon (G) downward while sandwiching the glass ribbon (G) from both front and back sides, and are arranged in a plurality of vertical stages, wherein each of rollers forming each of the roller pairs (5) is formed so as to be movable between a sandwiching position for sandwiching the glass ribbon (G) a retracted position that is separated from a conveyance path (P) of the glass ribbon (G) and is capable of preventing contact of flying objects flying from above, and wherein, when the glass ribbon (G) during conveyance is damaged, the roller (5a) that is positioned below a damaged part of the glass ribbon (G) moves to the retracted position.

6 Claims, 2 Drawing Sheets

(56) References Cited

FOREIGN PATENT DOCUMENTS

| JP | 2017-14075 | 1/2017 |
|----|------------|--------|
| JP | 2017-43524 | 3/2017 |

OTHER PUBLICATIONS

International Search Report dated Apr. 4, 2017 in International (PCT) Application No. PCT/JP2017/000081.
International Preliminary Report on Patentability dated Sep. 18, 2018 in International (PCT) Application No. PCT/JP2017/000081.

* cited by examiner

GLASS-PLATE MANUFACTURING DEVICE

TECHNICAL FIELD

The present invention relates to a manufacturing apparatus for a glass sheet including roller pairs, which are configured to convey a glass ribbon downward while sandwiching the glass ribbon from both front and back sides, and are arranged in a plurality of vertical stages.

BACKGROUND ART

As is well known, as one of methods of manufacturing a glass sheet, there has been known an overflow down-draw method. A manufacturing apparatus for a glass sheet, which carries out this method, includes a forming trough having a wedge shape. A molten glass, which is poured into a groove formed in an upper portion of the forming trough and overflows the groove into both sides thereof, is caused to flow down along side surfaces of the forming trough and to be merged and integrated in a lower end portion of the forming trough, to thereby form a glass ribbon to be an origin of a glass sheet.

Further, the above-mentioned apparatus includes roller pairs, which are configured to sandwich the glass ribbon from both front and back sides, and are arranged in a plurality of vertical stages, and the formed glass ribbon is conveyed while being drawn downward by the roller pairs. Through regulation of a drawing speed (sheet drawing rate) in this case, the thickness of the glass sheet to be manufactured is regulated. The glass ribbon during conveyance is subjected to heat treatment, for example, annealing treatment for removing strain (see Patent Literature 1).

CITATION LIST

Patent Literature 1: JP 2015-105206 A

SUMMARY OF INVENTION

Technical Problem

In the glass ribbon during conveyance, damages such as cracks may inevitably occur due to sandwiching by the roller pairs. In this case, glass chips are generated from a damaged part, and the glass chips flying from above may be stuck into the roller positioned below the damaged part. With this, the following problem arises. The roller having the glass chips stuck thereinto and the glass ribbon are brought into contact with each other, and the glass chips may scratch the glass ribbon in some cases. As a result, the quality of the glass sheet to be manufactured is degraded.

The above-mentioned problem may occur not only in the case of manufacturing a glass sheet by the overflow down-draw method but also in the case of manufacturing a glass sheet by the manufacturing apparatus for a glass sheet including roller pairs arranged in a plurality of vertical stages.

The present invention has been made in view of the above-mentioned circumstances, and a technical object of the present invention is to avoid occurrence of damages in a glass ribbon to the extent possible, to thereby suppress degradation in quality of a glass sheet to be manufactured, in the case of manufacturing the glass sheet by a manufacturing apparatus for a glass sheet including roller pairs, which are configured to convey the glass ribbon downward while sandwiching the glass ribbon from both front and back sides, and are arranged in a plurality of vertical stages.

Solution to Problem

According to one embodiment of the present invention, which has been made for purpose of solving the above-mentioned problem, there is provided a manufacturing apparatus for a glass sheet, comprising roller pairs, which are configured to convey a glass ribbon downward while sandwiching the glass ribbon from both front and back sides, and are arranged in a plurality of vertical stages, wherein at least one of rollers forming each of the roller pairs is formed so as to be movable between a sandwiching position for sandwiching the glass ribbon and a retracted position that is separated from a conveyance path of the glass ribbon and is capable of preventing contact of flying objects flying from above, and wherein, when the glass ribbon during conveyance is damaged, the movable roller that is positioned below a damaged part of the glass ribbon moves to the retracted position.

With the above-mentioned configuration, when the glass ribbon during conveyance is damaged, the movable roller positioned below the damaged part of the glass ribbon moves to the retracted position. Then, the movable roller having moved to the retracted position (the "movable roller having moved to the retracted position" is hereinafter sometimes expressed as "retracted roller") can prevent contact of the flying objects flying from above. Therefore, it is possible to suppress the occurrence of a situation in which glass chips generated from the damaged part fly from above to be stuck into the retracted roller. With this, it is possible to avoid, to the extent possible, the occurrence of a situation in which the movable roller having the glass chips stuck thereinto returns to the sandwiching position to be brought into contact with the glass ribbon. Further, scratching of the glass ribbon by the glass chips can be avoided to the extent possible. As a result, it is possible to suppress degradation in quality of the glass sheet to be manufactured.

In the above-mentioned configuration, the roller pairs in the plurality of vertical stages may be arranged in a furnace configured to subject the glass ribbon to heat treatment, the retracted position may be positioned in a recess that is formed on a furnace wall of the furnace and is capable of receiving the movable roller, and the recess may include a ceiling portion configured to cover an upper portion of the movable roller having moved to the retracted position.

With this, the recess formed on the furnace wall can receive the retracted roller (movable roller having moved to the retracted position). Further, there is provided the ceiling portion configured to cover the upper portion of the retracted roller. Therefore, it is possible to further suppress the occurrence of a situation in which the glass chips flying from above are stuck into the retracted roller.

In the above-mentioned configuration, it is preferred that the recess include a bottom portion positioned below the movable roller having moved to the retracted position, and that the bottom portion be formed so as to be inclined downward in a direction toward the conveyance path of the glass ribbon.

With this, the bottom portion of the recess is formed so as to be inclined downward in the direction toward the conveyance path of the glass ribbon. Therefore, even when the glass chips enter the recess, the glass chips can be discharged from the recess toward the conveyance path side. The glass chips having been discharged from the recess fall downward from the recess. With this, the situation in which the glass chips remain in the recess can be avoided, and the glass chips are easily removed from the furnace.

In the above-mentioned configuration, the furnace may comprise an annealing furnace configured to anneal the glass ribbon, and the roller pairs in the plurality of vertical stages arranged in the annealing furnace may be configured to regulate a thickness of the glass ribbon.

In the case of the above-mentioned configuration, the thickness of the glass ribbon is regulated in the annealing furnace, and hence the glass ribbon is particularly liable to be scratched when the glass chips are stuck into the roller including the movable roller. Therefore, in the case of such configuration, when the present invention is applied, the effects thereof can be particularly effectively utilized.

In the above-mentioned configuration, it is preferred that the manufacturing apparatus further comprise a cover member capable of moving in synchronization with the movable roller under a state of covering the upper portion of the movable roller.

With this, sticking of the glass chips flying from above into the roller can be more suitably suppressed by the cover member configured to cover the upper portion of the movable roller.

In the above-mentioned configuration, the movable roller may be formed so as to be movable between the sandwiching position and the retracted position through movement in a thickness direction of the glass ribbon.

With this, when the movable roller is caused to return from the retracted position to the sandwiching position, the roller moves in the thickness direction of the glass ribbon. Therefore, the glass ribbon is easily sandwiched by the roller having returned to the sandwiching position.

In the above-mentioned configuration, it is preferred that the sandwiching position and the retracted position have a separation distance of 30 mm or more.

With this, the separation distance between the sandwiching position and the retracted position can be sufficiently ensured. Therefore, sticking of the glass chips flying from above into the retracted roller can be more suitably suppressed.

In the above-mentioned configuration, the movable roller may be mounted on a roller shaft extending from the movable roller outward in a width direction of the glass ribbon and may be formed so as to be movable between the sandwiching position and the retracted position through movement in the width direction of the glass ribbon.

With this, the movable roller is movable between the sandwiching position and the retracted position merely through movement in an axial direction of the roller shaft. Therefore, the movable roller can rapidly move to the retracted position, which is advantageous for enabling the roller to avoid the glass chips flying from above.

Advantageous Effects of Invention

The manufacturing apparatus fora glass sheet according to one embodiment of the present invention is capable of avoiding occurrence of damages in a glass ribbon to the extent possible, to thereby suppress degradation in quality of a glass sheet to be manufactured.

DESCRIPTION OF EMBODIMENTS

Now, a manufacturing apparatus for a glass sheet according to an embodiment of the present invention is described with reference to the accompanying drawings.

Figure 1:
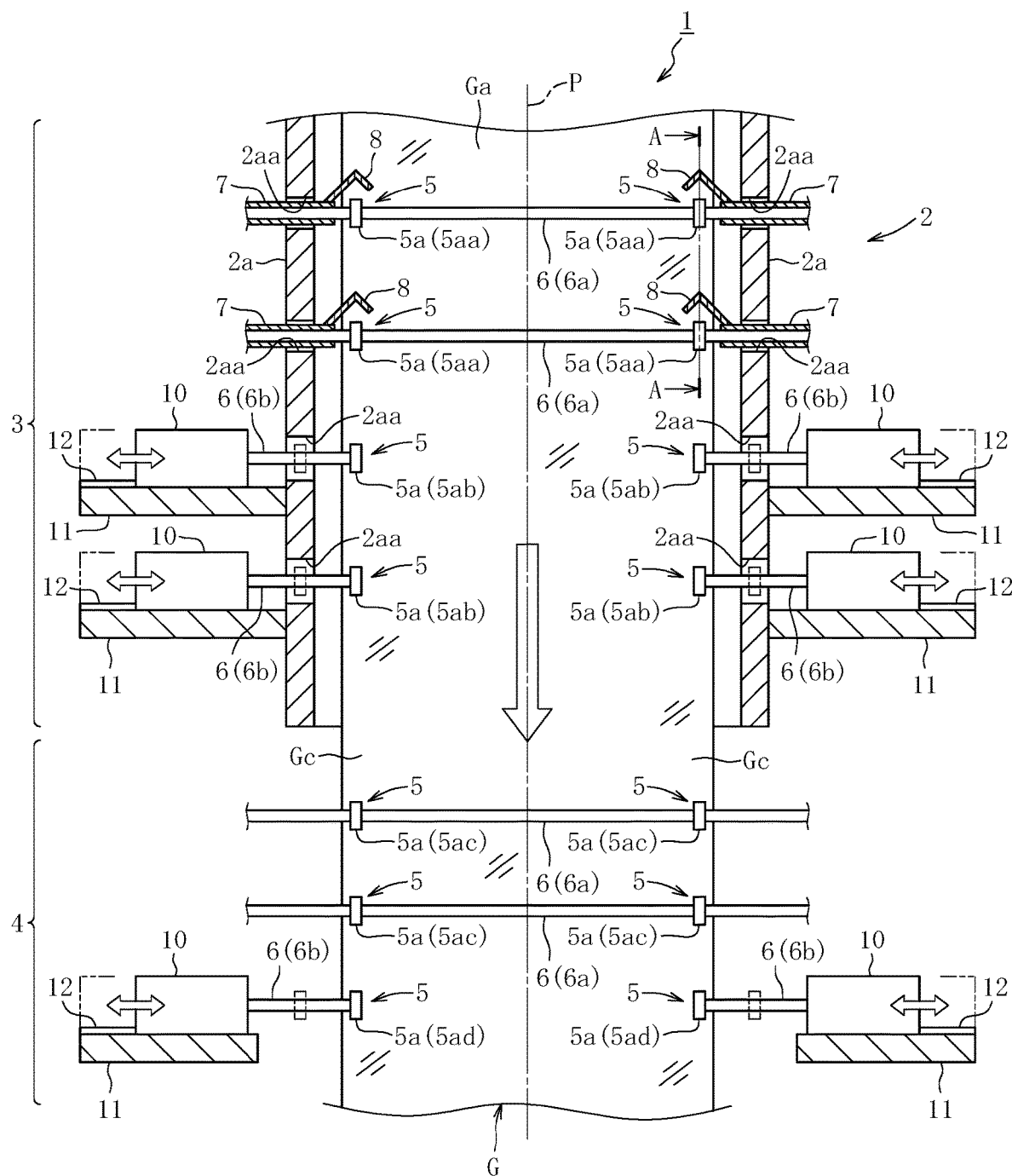
FIG. 1 is a front longitudinal sectional view for illustrating a manufacturing apparatus for a glass sheet according to an embodiment of the present invention.

As illustrated in FIG. 1, a manufacturing apparatus 1 for a glass sheet according to the embodiment of the present invention is configured to form a glass ribbon G to be an origin of a glass sheet by an overflow down-draw method. The manufacturing apparatus 1 for a glass sheet comprises an annealing portion 3 and a cooling portion 4. The annealing portion 3 is configured to subject the glass ribbon G formed by a forming trough (not shown) to annealing treatment as heat treatment while regulating the thickness of the glass ribbon G in an annealing furnace 2. The cooling portion 4 is configured to subject the glass ribbon G after the annealing treatment to cooling treatment for decreasing the temperature of the glass ribbon G to a temperature around room temperature in a clean room (not shown). The annealing portion 3 and the cooling portion 4 are arranged along a conveyance path P of the glass ribbon G extending in a vertical direction. The annealing portion 3 is arranged relatively on an upstream side of the conveyance path P, and the cooling portion 4 is arranged relatively on a downstream side of the conveyance path P.

In each of the annealing portion 3 and the cooling portion 4, roller pairs 5 configured to convey the glass ribbon G downward while sandwiching the glass ribbon G from both front and back sides are arranged in a plurality of vertical stages. In this embodiment, the roller pairs 5 in the vertical four stages are arranged in the annealing portion 3, and the roller pairs 5 in the vertical three stages are arranged in the cooling portion 4. Each of the roller pairs 5 is formed of a roller 5a arranged on a front surface Ga side of the glass ribbon G and a roller 5a arranged on aback surface Gb side of the glass ribbon G (the roller 5a on the back surface Gb side is not shown in FIG. 1). In the annealing portion 3, the thickness of the glass ribbon G can be regulated by regulating the drawing speed (sheet drawing rate) of the glass ribbon G with the roller pairs 5 in the vertical four stages.

Here, as a material for the roller 5a arranged in the annealing portion 3, silica, alumina, or the like can be used. Meanwhile, as a material for the roller 5a arranged in the cooling portion 4, a silicon rubber, a fluoro-rubber, or the like can be used.

In each of the roller pairs 5, each of the rollers 5a forming the roller pairs 5 is movable between a sandwiching position for sandwiching the glass ribbon G and a retracted position that is separated from the conveyance path P of the glass ribbon G and is capable of preventing contact of flying objects flying from above (described later in detail). In FIG. 1, there is illustrated a state in which each of the rollers 5a is at the sandwiching position, and the roller 5a positioned at the sandwiching position is brought into abutment against an end portion Gc (selvage portion) in a width direction of the glass ribbon G.

Each of the rollers 5a is mounted on the roller shaft 6 serving as a rotation shaft. The roller shaft 6 has one of the following two forms: a form in which two rollers 5a are mounted on one roller shaft 6 (hereinafter referred to as "A-type shaft 6a" or simply referred to as "shaft 6a"); and a form in which only one roller 5a is mounted on an end portion of one roller shaft 6 (hereinafter referred to as "B-type shaft 6h" or simply referred to as "shaft 6b"). In this embodiment, in the upper two stages of the annealing portion 3 and the upper two stages of the cooling portion 4, the A-type shafts 6a are provided. In the lower two stages of the annealing portion 3 and the lower one stage of the cooling portion 4, the B-type shafts 6b are provided. The B-type shaft 6b extends outward from the roller 5a in the width direction of the glass ribbon G. Both of the A-type shafts 6a and the B-type shafts 6b are each coupled to a drive source (not shown), for example, a motor. When the A-type shafts 6a and the B-type shafts 6b are rotated in association with the operation of the drive sources, each of the rollers 5a mounted on the shafts 6a and 6b is rotated.

In the annealing portion 3, the A-type shaft 6a is rotatably fitted on an inner side of a tubular body 7 having a cylindrical shape. The tubular body 7 is inserted in a through hole 2aa formed in a side wall 2a of the annealing furnace 2. Unlike the shaft 6a, the tubular body 7 is a non-rotary body. A cover member 8 configured to cover an upper portion of a roller 5aa is mounted on the tubular body 7. The cover member 8 is mounted on the tubular body 7 being a non-rotary body, and hence the cover member 8 can maintain a state of covering the upper portion of the roller 5aa irrespective of whether or not the shaft 6a is rotated.

Here, as a modification example of this embodiment, a U-shaped covering member may be arranged in place of the tubular body 7. The U-shaped covering member is inserted in the through hole 2aa, and has an opening for receiving the shaft 6a in a lower portion. Alternatively, a plate body may be arranged in place of the tubular body 7. The plate body is inserted in the through hole 2aa and is configured to cover an upper portion of the shaft 6a.

Figure 2:
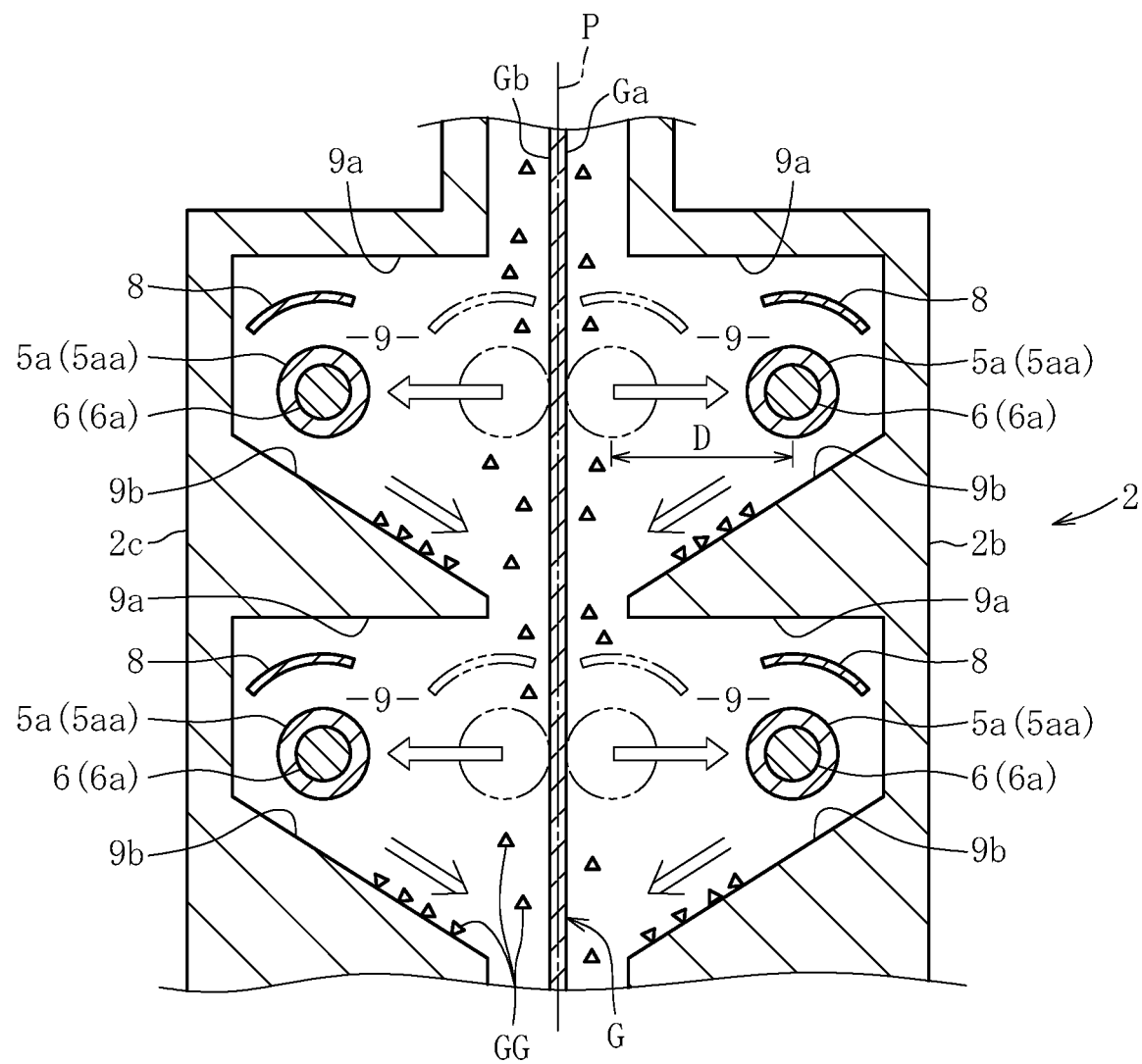
FIG. 2 is a side longitudinal sectional view taken along the line A-A of FIG. 1.

As illustrated in FIG. 2, the A-type shaft 6a is movable in the thickness direction of the glass ribbon G. In association with the movement of the shaft 6a, the roller 5aa moves between the sandwiching position indicated by the two-dot chain lines in FIG. 2 and the retracted position indicated by the solid lines in FIG. 2. Here, as described later, in order to allow the roller 5aa having moved to the retracted position to easily avoid glass chips GG flying from above, a separation distance D between the sandwiching position and the retracted position is set to 30 mm or more. When the shaft 6a moves, the tubular body 7 moves following the shaft 6a. With this, the cover member 8 mounted on the tubular body 7 moves in synchronization with the roller 5aa under a state of covering the upper portion of the roller 5aa.

The retracted position is positioned in recesses 9 formed respectively on a front wall 2b and a back wall 2c of the annealing furnace 2. The recess 9 is formed so that the conveyance path P side of the glass ribbon G is opened and can receive the roller 5aa. Further, the recess 9 comprises a ceiling portion 9a and a bottom portion 9b. The ceiling portion 9a is configured to cover the upper portion of the roller 5aa having moved to the retracted position. The bottom portion 9b is positioned below the roller 5aa. The bottom portion 9b is formed so as to be inclined downward in a direction toward the conveyance path P of the glass ribbon G.

The movement of the roller 5aa to the retracted position is performed when the glass ribbon G is damaged. More specifically, when the glass ribbon G is damaged on an upstream side of the conveyance path P of the glass ribbon G from the roller 5aa, that is, above the roller 5aa, the roller 5aa moves to the retracted position. With this, it is possible to prevent, to the extent possible, contact between the glass chips GG, which are generated from the damaged part of the glass ribbon G and fly from above and the roller 5aa. The glass chips GG flying from above may enter the recesses 9 formed on the front wall 2b and the back wall 2c, but the glass chips GG are discharged from each of the recesses 9 to the conveyance path P side by the inclined bottom portion 9b. Further, when the glass ribbon G is damaged, the roller 5aa positioned above the damaged part does not move to the retracted position and maintains the state of being positioned at the sandwiching position.

Here, the movement of the roller 5aa to the retracted position may be performed manually by an operator who checks damages of the glass ribbon G. A detector configured to detect damages of the glass ribbon G may be set so as to control the movement of the roller 5aa based on detection results of the detector. As an example of the detector, there may be given an image pickup unit, for example, a camera set so as to be directed to the glass ribbon G on the side wall 2a, the front wall 2b, or the back wall 2c of the annealing furnace 2.

As illustrated in FIG. 1, in the annealing portion 3, the B-type shaft 6b is coupled to a housing 10 accommodating a drive source of the shaft 6b. The housing 10 is arranged on a support base 11 mounted on the side wall 2a of the annealing furnace 2. A guide rail 12 configured to move the housing 10 in the width direction of the glass ribbon G (axial direction of the shaft 6b) is set on the support base 11. The shaft 6b moves in the width direction of the glass ribbon G in association with the movement of the housing 10 along the guide rail 12. With this, following the movement of the shaft 6b, a roller 5ab mounted on the shaft 6b is movable between the sandwiching position indicated by the solid lines in FIG. 1 and the retracted position indicated by the two-dot chain lines in FIG. 1.

The retracted position is positioned in the through hole 2aa through which the shaft 6b formed on the side wall 2a of the annealing furnace 2 is inserted. The movement of the roller 5ab to the retracted position is performed when the glass ribbon G is damaged in the same manner as in the roller 5aa mounted on the A-type shaft 6a. That is, when the glass ribbon G is damaged on an upstream side of the conveyance path P of the glass ribbon G from the roller 5ab, the roller 5ab moves to the retracted position. The movement of the roller 5ab to the retracted position may be performed manually by an operator in the same manner as in the roller 5aa mounted on the A-type shaft 6a. Alternatively, the movement of the roller 5ab may be controlled based on detection results of a detector.

Here, as a modification example of this embodiment, the retracted position of the roller 5ab mounted on the B-type shaft 6b may be positioned more on an outer side in the width direction of the glass ribbon G from the through hole 2aa. In other words, the retracted position may be positioned outside the annealing furnace 2. Further, in the same manner as in the roller 5aa mounted on the A-type shaft 6a, the roller 5ab may move between the sandwiching position and the retracted position through movement in the thickness direction of the glass ribbon G. Also in this case, it is preferred that the recess 9 be formed on each of the front wall 2b and the back wall 2c of the annealing furnace 2 to position the retracted position in the recess 9. Further, the shaft 6b may be rotatably fitted on an inner side of the tubular body 7, and the upper portion of the roller 5ab may be covered with the cover member 8 mounted on the tubular body 7.

In the cooling portion 4, rollers 5ac and 5ad mounted respectively on the A-type shaft 6a and the B-type shaft 6b, have substantially the same configurations as those of the rollers 5aa and 5ab mounted respectively on the shafts 6a and 6b of the same types in the annealing portion 3. The rollers 5ac and 5ad arranged in the cooling portion 4 are different from the rollers 5*aa* and 5*ab* arranged in the annealing portion 3 in that, in the roller 5*ac* mounted on the A-type shaft 6*a*, the tubular body 7 having the shaft 6*a* fitted thereto and the cover member 8 configured to cover the upper portion of the roller 5*ac* are removed. As a matter of course, as a modification example of this embodiment, the tubular body 7 and the cover member 8 may be provided. Other configurations are the same as those of the rollers 5*aa* and 5*ab* arranged in the annealing portion 3, and hence overlapping description thereof is omitted.

Now, the main action and effect of the manufacturing apparatus 1 for a glass sheet are described.

In the manufacturing apparatus 1 for a glass sheet, when the glass ribbon G during conveyance is damaged, the roller 5*a* positioned below the damaged part of the glass ribbon G moves to the retracted position. Therefore, it is possible to suppress the occurrence of a situation in which the glass chips GG generated from the damaged part fly from above to be stuck into the roller 5*a*. With this, it is possible to prevent, to the extent possible, the contact between the roller 5*a* having the glass chips GG stuck thereinto and the glass ribbon G. Further, scratching of the glass ribbon G by the glass chips GG can be avoided to the extent possible. As a result, it is possible to suppress degradation in quality of the glass sheet to be manufactured.

Here, the manufacturing apparatus for a glass sheet according to the present invention is not limited to the configuration described in the above-mentioned embodiment. In the above-mentioned embodiment, the retracted position of the roller arranged in the annealing portion is positioned in the recess formed on the front wall and the back wall of the annealing furnace and the through hole formed in the side wall, but the present invention is not limited thereto. For example, a plate-like member extending from the front wall, the back wall, or the side wall of the annealing furnace to the conveyance path side of the glass ribbon may be set so that the retracted position is positioned below the plate-like member.

Further, in the above-mentioned embodiment, the roller moves between the sandwiching position and the retracted position through movement in the thickness direction or the width direction of the glass ribbon, but the present invention is not limited thereto. For example, the roller mounted on the B-type shaft in the cooling portion may move between the sandwiching position and the retracted position through rotation about an axis extending in the thickness direction of the glass ribbon.

REFERENCE SIGNS LIST 1 manufacturing apparatus for glass sheet
2 annealing furnace
2*a* side wall
2*b* front wall
2*c* back wall
5 roller pair
5*a* roller
5*aa* roller
5*ab* roller
5*ac* roller
5*ad* roller
6 roller shaft
6*a* roller shaft
6*b* roller shaft
8 cover member
9 recess
9*a* ceiling portion
9*b* bottom portion
D separation distance
G glass ribbon
GG glass chip
P conveyance path

The invention claimed is:

1. A manufacturing apparatus for a glass sheet, comprising roller pairs, which are configured to convey a glass ribbon downward while sandwiching the glass ribbon from both front and back sides, and are arranged in a plurality of vertical stages,
   wherein at least one of rollers forming each of the roller pairs is formed so as to be movable between a sandwiching position for sandwiching the glass ribbon and a retracted position that is separated from a conveyance path of the glass ribbon, and is capable of preventing contact of flying objects flying from above,
   wherein, when the glass ribbon during conveyance is damaged, the movable roller that is positioned below a damaged part of the glass ribbon moves to the retracted position,
   wherein the roller pairs in the plurality of vertical stages are arranged in a furnace configured to subject the glass ribbon to heat treatment,
   wherein the retracted position is positioned in a recess that is formed on a furnace wall of the furnace and is capable of receiving the movable roller,
   wherein the recess includes a ceiling portion configured to cover an upper portion of the movable roller having moved to the retracted position,
   wherein the recess includes a bottom portion positioned below the movable roller having moved to the retracted position, and
   wherein the bottom portion is formed so as to be inclined downward in a direction toward the conveyance path of the glass ribbon.

2. The manufacturing apparatus for a glass sheet according to claim 1,
   wherein the furnace comprises an annealing furnace configured to anneal the glass ribbon, and
   wherein the roller pairs in the plurality of vertical stages arranged in the annealing furnace are configured to regulate a thickness of the glass ribbon.

3. The manufacturing apparatus for a glass sheet according to claim 1, further comprising a cover member capable of moving in synchronization with the movable roller under a state of covering the upper portion of the movable roller.

4. The manufacturing apparatus for a glass sheet according to claim 1, wherein the movable roller is formed so as to be movable between the sandwiching position and the retracted position through movement in a thickness direction of the glass ribbon.

5. The manufacturing apparatus for a glass sheet according to claim 4, wherein the sandwiching position and the retracted position have a separation distance of 30 mm or more.

6. The manufacturing apparatus for a glass sheet according to claim 1, wherein the movable roller is mounted on a roller shaft extending from the movable roller outward in a width direction of the glass ribbon and is formed so as to be movable between the sandwiching position and the retracted position through movement in the width direction of the glass ribbon.

* * * * *